April 18, 1939. H. R. HARRIGAN 2,154,614
THIRD DIMENSION ORNAMENTATION AND METHOD OF PRODUCING THE SAME
Filed Aug. 19, 1937  3 Sheets—Sheet 1
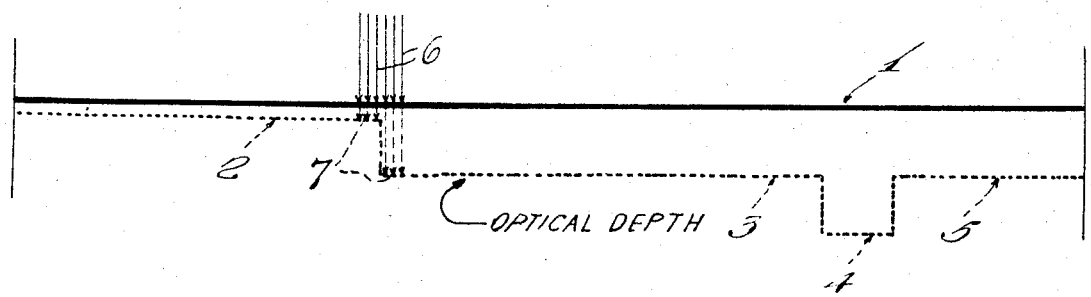
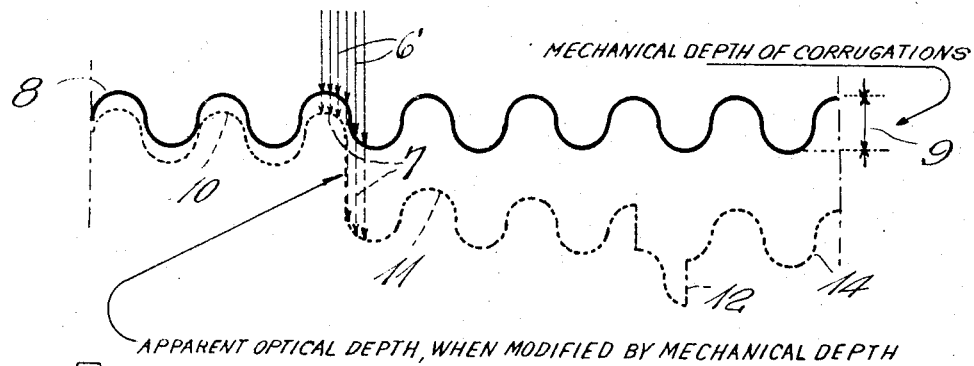
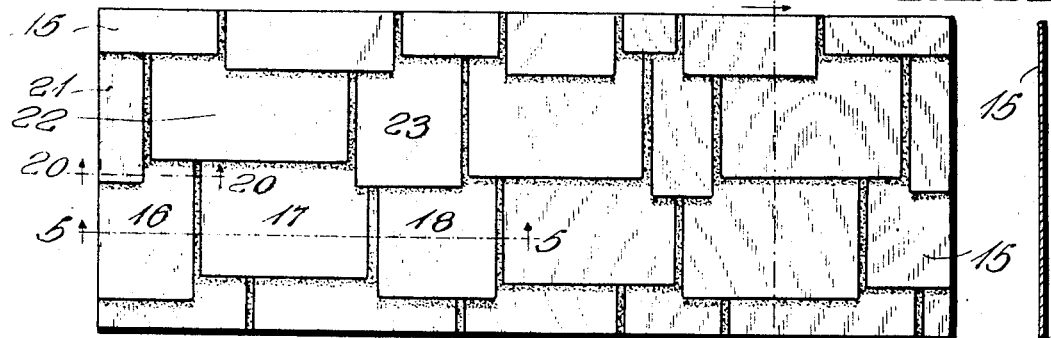
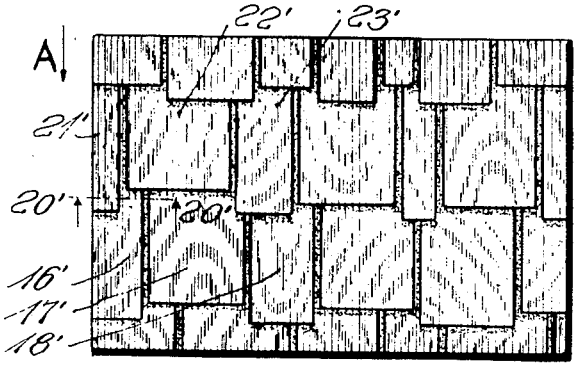
INVENTOR.
Herman R. Harrigan,
BY John B. Brady
ATTORNEY.

April 18, 1939.　　　H. R. HARRIGAN　　　2,154,614
THIRD DIMENSION ORNAMENTATION AND METHOD OF PRODUCING THE SAME
Filed Aug. 19, 1937　　　3 Sheets-Sheet 2
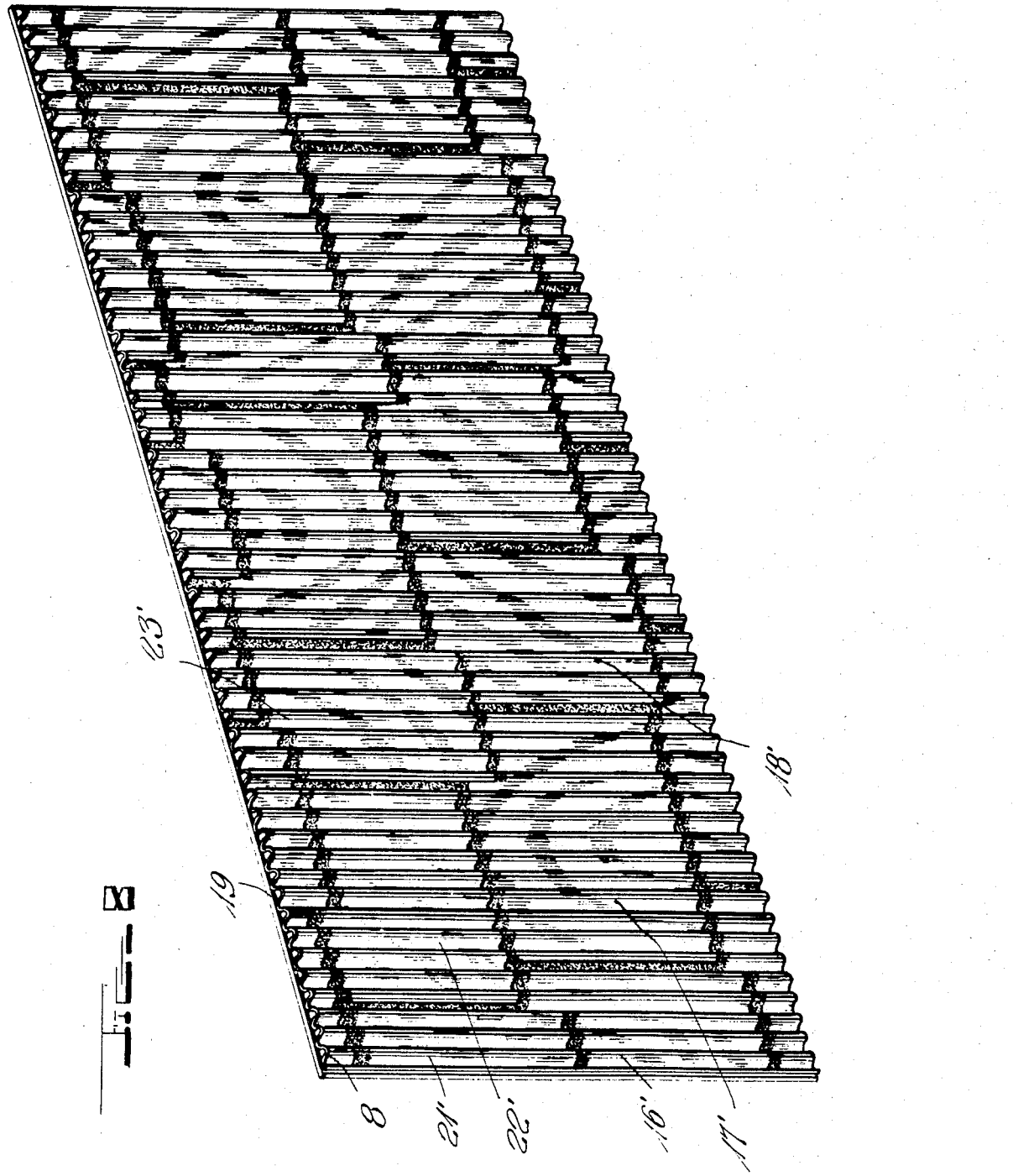
INVENTOR.
Herman R. Harrigan,
BY John B. Brady
ATTORNEY.

April 18, 1939.     H. R. HARRIGAN     2,154,614
THIRD DIMENSION ORNAMENTATION AND METHOD OF PRODUCING THE SAME
Filed Aug. 19, 1937     3 Sheets-Sheet 3
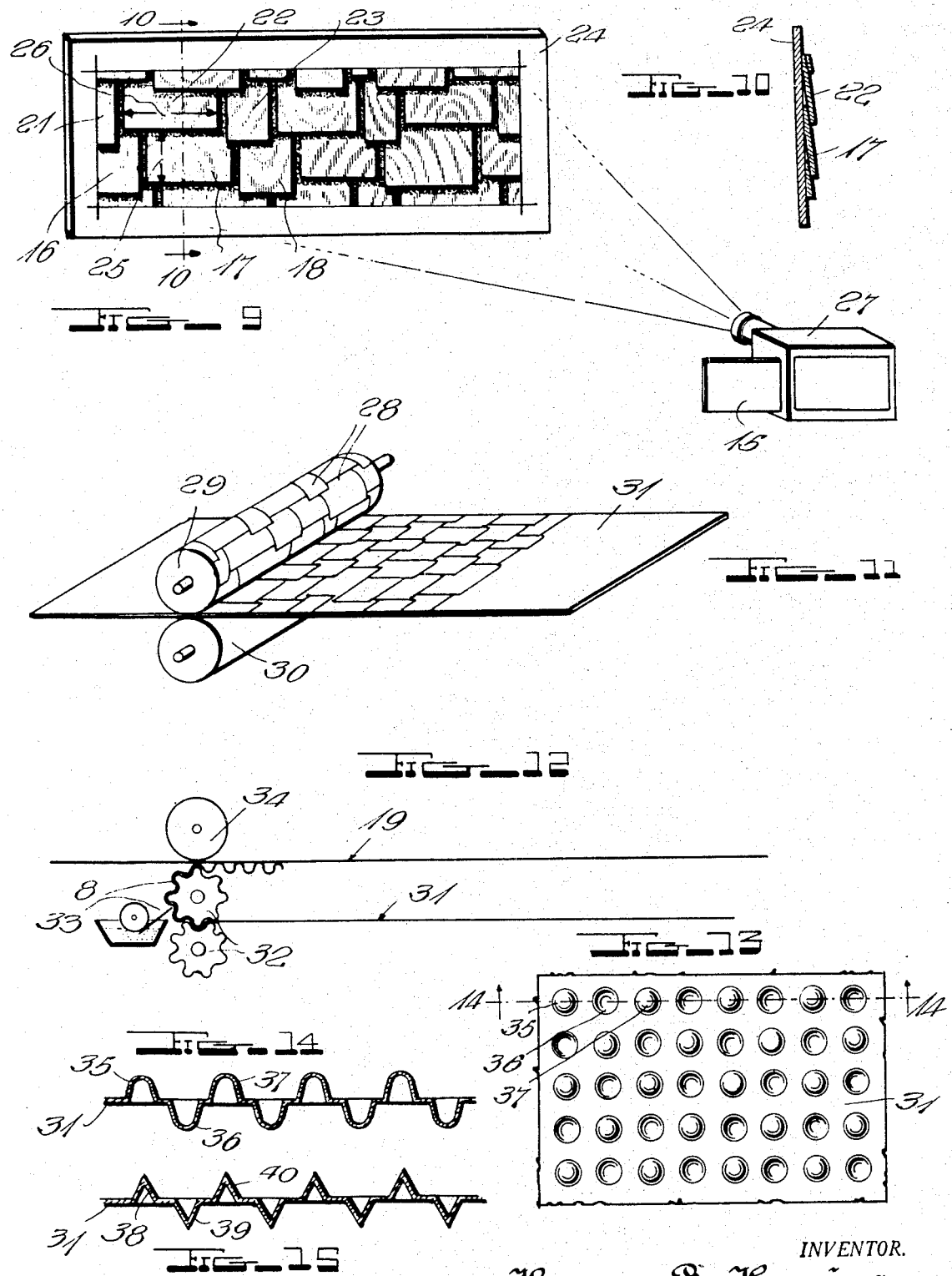
INVENTOR.
Herman R. Harrigan,
BY John B. Brady
ATTORNEY Patented Apr. 18, 1939

2,154,614

UNITED STATES PATENT OFFICE 2,154,614

THIRD DIMENSION ORNAMENTATION AND METHOD OF PRODUCING THE SAME

Herman R. Harrigan, Chevy Chase, Md., assignor to District of Columbia Paper Mills, Incorporated, Washington, D. C., a corporation of Virginia Application August 19, 1937, Serial No. 159,975

13 Claims. (Cl. 41—24)

My invention relates broadly to ornamentation and more particularly to third dimension ornamentation and method of producing the same.

One of the objects of my invention is to provide a method of producing an ornamental display having the effect of optical depth or pictorial perspective.

Another object of my invention is to provide a method of producing ornamental displays in which optical depth is combined with mechanical depth for producing an effect of substantial realism assimilating the original physical display.

Still another object of my invention is to provide third dimension ornamentation and provide a method for preparing the same wherein a preformed pattern of an object is superimposed upon a surface having mechanical depth so proportioned to the preformed pattern that the object may be viewed in an infinite number of planes for imparting to the final display an effect of perspective and realism of high esthetic qualities.

A further object of my invention resides in the selection of designs having optical depth which when superimposed upon a surface having mechanical depth produce a display having the appearance of relief and optical perspective which is attractive for advertising and ornamental display purposes.

Other and further objects of my invention reside in the method of producing ornamental displays and the structure of the ornmental displays as set forth more fully in the specification hereinafter following by reference to the accompanying drawings in which:

Figure 1 is a theoretical view explaining the nature of the subject which I select for purposes of display as having optical depth; Fig. 2 is a theoretical view illustrating the method by which an apparent optical depth is imparted to the reproduction of the subject when modified by mechanical depth; Fig. 3 illustrates the reproduction of a subject in a single plane for illustrating the principles of my invention; Fig. 4 is a cross sectional view taken on line 4—4 of Fig. 3; Fig. 5 is a cross sectional view taken on line 5—5 of Fig. 3; Fig. 6 is a representation of the subject illustrated in Fig. 3 after mechanical depth has been imparted to the subject by superimposing a reproduction of the subject illustrated in Fig. 3 on a corrugated background; Fig. 7 is an end view of Fig. 6 looking in the direction of the arrow A; Fig. 8 is a perspective view of the third dimension ornamentation of my invention illustrated by the subject shown in Figs. 3 and 6; Fig. 9 is a schematic view illustrating the photographic method I employ in the production of third dimension ornmentation of my invention; Fig. 10 is a cross sectional view taken on line 10—10 of Fig. 9; Fig. 11 illustrates one form of printing process I may employ in the method of my invention; Fig. 12 schematically shows one method of imparting mechanical depth to the optical depth subject employed in the system of my invention; Fig. 13 is an elevational view showing a modified method of imparting mechanical depth to the optical depth subject employed in the system of my invention; Fig. 14 is a cross sectional view taken on line 14—14 of Fig. 13; and Fig. 15 is a cross sectional view of a further modified method of imparting mechanical depth to an optical depth subject according to my invention.

My invention involves the selection of objects, patterns, displays or designs which possess optical depth for reproduction in a manner which will simulate the original objects, patterns, displays or designs with a high degree of realism and attractiveness. My invention finds particular application in the preparation of decorative patterns or pictorial displays for advertising purposes in show window displays and wherein an esthetic effect is desired in assimilating the original objects, patterns, displays or designs. The subject treated in the third dimensional ornamentation and method of producing such ornamentation is selected as one which exists in two or more planes wherein the total distance between the extreme limits of the more widely separated planes of vision is not too great. That is to say, a picture of the subject will possess limited "optical depth" which is the apparent relative displacement, from the frame of a planar two dimensional picture, of elements in the picture. "Actual depth" of the subject treated is the physical relative displacement, from the front frame of a planar two dimensional picture, of third dimensional elements in the picture. Optical depths in a two dimensional perspective picture are proportioned to the actual depths in the subject pictured. Theoretically, the introduction of optical apparatus between the observer and the picture creates variances. Actual depth may be more faithfully reproduced from optical depth therefore by one dimensional displacement of picture elements to scale, the planar dimensions of the picture being distorted in accordance with the degree of displacement of the elements.

This degree of displacement may be called "mechanical depth" in the resulting reproduction, and is related only to the degree of distortion in the picture. Thus in order to reproduce actual depth, it is necessary to distort the optical depth of each picture element and proportionately provide mechanical depth for each element.

In the treatment of homographic objects, I have found that the most attractive optical displays may be produced according to my method where the optical off-set of the picture elements is proportioned to the mechanical off-set of the display for imparting normal appearance to the original object. I so select the object for display that the ratio of the limiting planes between the maximum and minimum optical depth of the object does not exceed approximately eight times the depth of the mechanical off-set of the display.

Relatively fine corrugations having a multiplicity of high and low levels for producing an infinite number of optical planes for the elements of the display provide mechanical depths of uniform disposition and variance. Having selected the object for reproduction having regard to the optical depth possessed by the object, I provide a preformed pattern of the object. I may photograph the preformed pattern, making provision for distortion in the pattern which is corrected when the pattern of optical depth is superimposed upon a background having mechanical depth. The preformed pattern is photographed with the optical elements along one axis wholly normal but with the optical elements along another axis distorted. The preformed pattern thus photographed is reproduced in a suitable manner for the purpose of printing. Printing is effected in desired colors and then the especially prepared pattern of optical depth is superimposed upon a corrugated background imparting mechanical depth to the pattern. The result of combining optical depth and mechanical depth imparts an esthetic appearance to the reproduced pattern which assimilates the original object and has a high perspective property.

Referring to the drawings in detail, reference character 1 indicates the average plane surface of a subject having optical depth. The average plane surface 1 is a two dimensional planar figure with reference to which a multiplicity of picture elements may exist in an infinite number of planes. I have indicated certain of the elements of the subject as existing in a plane with respect to the plane surface 1 having an average displacement from the plane surface 1 as represented by dotted line 2. I have illustrated the displacement of other picture elements as having an average displacement from plane surface 1 along dotted line 3. I have shown an average displacement from the plane surface 1 along dotted line 4 of other picture elements. Other picture elements may be displaced from planar surface 1 along an average line indicated at 5. For convenience and consistency, I have shown in Fig. 1 a theoretical section at line 20—20, Fig. 3. It will accordingly be understood that in selecting the subject for reproduction in accordance with my invention, I choose a subject which exists in two or more planes where the optimum optical depth is not too great. The line of vision for viewing the subject has been indicated in the general direction of arrows 6. The retina of the eye of the observer receives the apparent optical depth of the subject from the plane of the picture whereas the actual full depth of the subject as indicated at 7 is displaced below the two dimensional planar limits of the picture.

In Fig. 2 I have illustrated a background constituted by a corrugated sheet of material 8. The corrugated sheet of material 8 comprises a multiplicity of fine corrugations providing an infinite number of high levels and low levels in which the optimum mechanical depth is indicated by the distance 9. A reproduction of the subject illustrated in Fig. 1 is superimposed upon the corrugated background 8. The apparent optical depth which is now imparted to the retina of the eye of an observer (theoretically in a section at line 20'—20', Fig. 6,) exists along the dotted lines indicated at 10 corresponding to the portion 2 of the subject 1; at 11 corresponding to the portion 3 of the subject 1; at 12 corresponding to the portion 4 of the subject 1; and at 14 corresponding to the portion 5 of the subject 1. The observer viewing the figure which results from the combination of the optical depth subject superimposed upon the background having mechanical depth, sees the composite display along optical lines 6' which now have the apparent displacement 7' in an infinite number of planes off-set one from another. The original subject accordingly has the appearance of existing in many different planes so that an optical perspective effect results. The subject appears as though standing in relief with the elements thereof in apparent displacement in relation to the actual physical properties of the original subject.

It will be observed that the multiplicity of fine corrugations illustrated in Fig. 2, has introduced a lateral reduction in width of the original display illustrated in Fig. 1. The vertical dimension of the two dimensional planar subject has not changed, although the lateral dimension has been reduced. A study of this effect resulted in a determination that the ratio of the limiting planes of the optical depth of the subject should not exceed eight times the depth of the mechanical off-set for the production of the best proportioned optical display. That is to say, the optical off-set is proportioned to the mechanical offset of the picture elements to impart a normal appearance to the original subject. Such distortion as may be introduced in the original reproduction of the subject may be corrected by the super-position of the subject on the background having mechanical depth to produce a display of normal appearance.

In Fig. 3, I have illustrated a film negative 15 on which a subject having optical depth has been photographed. I have selected a pattern formed by prearrangement of a multiplicity of shingles 16, 17, 18, etc. for the purpose of explaining my invention. Many varieties of designs and displays may be reproduced in accordance with my invention and the pictorial representation shown is merely to illustrate the principles of my invention. The film negative 15 is a faithful reproduction of the subject photographed and possesses the property of optical depth. From the film negative the subject having optical depth may be reproduced in any desired manner. After reproduction of the optical depth subject mechanical depth is imparted to the subject by corrugating the plane sheet of material on which the optical depth subject is reproduced as indicated at 8 in Fig. 7, and I impart necessary strength and supporting means to the corrugations by the backing sheet illustrated at 19. In Fig. 6 the combined effect of the optical depth subject and the mechanical depth background is shown in elevation. The shingles illustrated at 16, 17, 18, etc. in Fig. 3 now appear at 16', 17', 18', etc. as in Fig. 6 wherein the lateral dimension has been foreshortened although the longitudinal dimension remains unaltered. This fact is illustrated by comparing the size of the lateral element limited by the arrows 20 in Fig. 3 with the size of the lateral element limited by the arrows 20' in Fig. 6. This effective distortion of the subject as finally displayed must accordingly be provided for in many subjects by the fabrication of the subject in abnormal or distorted form. For example, in Fig. 3, it will be observed that shingles 16, 17, 18, etc. are represented as being overlapped by shingles 21, 22, 23 along their vertical axes to a greater extent than is normal in the customary laying of shingles. However, when mechanical depth is imparted to the subject thus originally distorted, the subject when viewed in Fig. 6, shows an apparent normal overlap by shingles 21', 22' and 23' with respect to shingles 16', 17', 18', etc. The reason for this will be clear as the apparent width of shingles 16', 17', 18', etc. has been reduced while the extent of overlap by shingles 21', 22' and 23' has not been changed, so that the proper proportion of overlap is reproduced. The retina of the eye of the observer therefore experiences an illusion as the observer sees the subject in the form in which the eye customarily views the subject.

In Fig. 8 I have shown corrugations 8 mounted with respect to the stiffening member or support 19. The corrugations 8 impart the mechanical depth required for viewing the optical depth subject in optical perspective. It will be seen that shingles 21', 22' and 23' have the appearance of overlapping shingles 16', 17', 18', etc. in the customary and accepted manner although, as it has been pointed out, the optical depth subject reproduced on the optical depth print which is superimposed upon the mechanical depth background is in fact wholly different from the appearance which the retina of the eye experiences in viewing the third dimension ornamentation as ultimately displayed.

In Fig. 9 I have illustrated the method of originally preparing the subject from which the third dimension ornamentation is produced. A suitable supporting panel 24 is provided upon which the subject is fabricated. In the subject selected for illustration, shingles 16, 17, 18, etc. are laid upon panel 24 and shingles 21, 22, and 23 are laid thereover in overlapping relation to shingles 16, 17, 18, etc. to a greater degree than is customary. That is to say, the extent of overlap indicated by arrow 25 is greater than the width of the shingle as indicated at 26 would normally permit in actual practice. The prefabricated pattern thus prepared is photographed by means of the camera indicated at 27. The film 15 previously illustrated in Fig. 3 is developed. The subject as illustrated in Fig. 3 is etched as indicated at 28 on printing roller 29, as illustrated in Fig. 11. Printing roller 29, coacting with suitable pressure rollers 30, produce an imprint of the optical depth subject on the sheet 31. The sheet 31 with the optical depth print thereon is passed between corrugating rollers 32 as illustrated in Fig. 12, and mechanical depth is imparted to the optical depth subject by the formation of the multiplicity of fine corrugations 8. The rear faces of the longitudinally extending ribs or corrugations 8 have mucilage or paste applied thereto by suitable brush 33 and the backing or supporting sheet 19 is pressed into engagement with the corrugations 8 by suitable pressure roller 34, thus producing the completed article of manufacture previously illustrated in Figs. 6 and 7.

As heretofore noted, the corrugations 8 provide an infinite number of planes in which the optical depth subject may be viewed, however, it is essential that the mechanical depth be obtained simply by the corrugations as mechanical depth may be imparted to the optical depth subject by displacing adjacent portions of the optical depth subject in a variety of ways. In Fig. 13, I have illustrated the optical depth subject 31 as having rounded portions 35, 36, 37, etc. off-set from the plane of the optical depth subject 31 in alternate directions. This arrangement allows the optical depth subject to be viewed in an infinite number of different planes giving the effect of optical perspective. I may extend the rounded off-sets all in the same direction and produce somewhat of an optical perspective effect. In lieu of the rounded off-sets, I may provide cone shaped out-struck projections shown at 38, 39, 40, etc. and an optical perspective is thus imparted to the optical depth subject reproduced on the sheet of material 31. It is not essential that the cone shaped projections extend alternately in opposite directions as illustrated, and I may arrange the projections all in one direction.

The forms illustrated in Figs. 13, 14 and 15 are particularly suitable for reproductions of subjects which possess substantially uniform optical depth in two directions and which require uniformity in optical perspective. Such uniformity is obtained in the final display as the subject is broken up into elements which do not possess a greater longitudinal dimension than a lateral dimension as is the case with corrugations.

I have found the third dimension ornamentation of my invention highly practical and successful in manufacture and production. I reproduce the optical depth subject on paper and superimpose the reproduced optical depth subject on a stiff background such as heavy cardboard. However, I may use other materials and I may make other and further modifications in my invention and I intend no limitations upon my invention other than may be imposed by the scope of the appended claims.

What I claim as new and desire to secure by Letters Patent of the United States is as follows:

1. As a new article of manufacture, a novelty display device comprising a sheet bearing a visual reproduction of an object with varying optical depths limited to a predetermined maximum and having corrugations therein of regular definition producing mechanical depths in said sheet proportional to the maximum optical depth and cooperatively effective with the varying optical depths in the reproduction to produce a novel and attractive optical effect.

2. An ornamental sheet material comprising a sheet of material containing a representation of a selected homographic subject having limited maximum optical depth, and a supporting carrier for said sheet of material having regular variations in mechanical depth proportionately related to the maximum optical depth in said subject for imparting optical perspective to the subject displayed on said sheet of material.

3. An ornamental sheet material comprising a sheet of material containing a representation of a selected subject having limited maximum optical depth, and a supporting carrier for said sheet of material having a multiplicity of relatively fine corrugations proportionately related to the maximum optical depth in said subject for imparting the appearance of mechanical depth to said subject having optical depth for setting forth the subject displayed on said sheet of material in optical perspective.

4. An ornamental sheet material comprising a sheet of material containing a representation of a selected subject having limited maximum optical depth, and a supporting carrier for said sheet of material having a multiplicity of regularly spaced oppositely directed surface elements in adherence with said sheet of material and proportionately related to the maximum optical depth in said subject for imparting mechanical depth to said subject having optical depth, and setting forth said subject in optical perspective.

5. An ornamental sheet material comprising a sheet of material containing a representation of a selected subject having limited maximum optical depth, and a supporting carrier for said sheet of material having a multiplicity of closely positioned rounded surface projections extending from the plane thereof in adherence with said sheet of material and proportionately related to the maximum optical depth in said subject for imparting mechanical depth to said subject having optical depth, and setting forth said subject in optical perspective.

6. An ornamental sheet material comprising a sheet of material containing a representation of a selected subject having limited maximum optical depth, and a supporting carrier for said sheet of material having a multiplicity of closely positioned rounded surface elements projecting from the plane thereof in alternate directions in adherence with said sheet of material and proportionately related to the maximum optical depth in said subject for imparting mechanical depth to said subject having optical depth, and setting forth said subject in perspective.

7. An ornamental sheet material comprising a sheet of material containing a representation of a selected subject having limited maximum optical depth, and a supporting carrier for said sheet of material having a plurality of closely positioned conical shaped projections extending from the plane thereof in adherence with said sheet of material and proportionately related to the maximum optical depth in said subject for imparting mechanical depth to said subject having optical depth, and setting forth said subject in optical perspective.

8. An ornamental sheet material comprising a sheet of material containing a representation of a selected subject having limited maximum optical depth, and a supporting carrier for said sheet of material having a plurality of closely positioned conical shaped projections extending in alternate directions from the plane thereof in adherence to said sheet of material and proportionately related to the maximum optical depth in said subject for imparting mechanical depth to said subject having optical depth, and setting forth said subject in optical perspective.

9. The method of producing third dimension ornamentation which comprises fabricating a subject having a limited maximum optical depth with one dimension thereof distorted while maintaining another dimension normal, photographing the fabricated optical depth subject, printing the fabricated optical depth subject, and corrugating the print of the fabricated optical depth subject to a depth proportional to the maximum optical depth of said subject and in a direction which corrects for the distortion in said one direction to substantial normalcy while displaying said optical depth subject in unaltered dimension in the second mentioned direction.

10. An ornamental sheet material comprising a sheet bearing a two-dimensional reproduction of a subject having limited maximum optical depth, said reproduction being optically enlarged along one dimension proportional to the maximum optical depth of said subject, and said sheet having corrugations therein to a depth proportional to the maximum optical depth of said subject arranged to correct to substantial normalcy the enlarged dimension of said reproduction and to impart optical perspective to said reproduction.

11. Ornamental sheet material comprising a sheet bearing a two-dimensional reproduction of a subject having limited maximum optical depth, and means for imparting optical perspective to said reproduction consisting of regular planar displacements of said sheet in number and depth proportional to the maximum optical depth of said subject to produce the desired effect.

12. Ornamental sheet material comprising a sheet bearing a two-dimensional reproduction of a subject having limited maximum optical depth, and means for imparting optical perspective to said reproduction consisting of regular planar displacements of said sheet proportional in depth to the maximum optical depth of said subject in a ratio of at least 1:8.

13. Ornamental sheet material comprising a sheet bearing a two dimensional reproduction of a subject which has all optical objective elements within a limited maximum actual depth, and means for imparting optical perspective to said reproduction consisting of regular planar displacements in said sheet proportional to the maximum actual depth of said subject, said planar displacements being effective to provide an infinite number of superimposed visual planes comprising points of like phases of displacement from the original plane of said reproduction, optical objective elements of said subject being visually detected individually in the visual plane located proportional to the actual depth of the respective element.

HERMAN R. HARRIGAN.